United States Patent
Kasher et al.

(10) Patent No.: US 8,908,792 B2
(45) Date of Patent: Dec. 9, 2014

(54) APPARATUS AND METHODS USING AN EFFICIENT GOLAY CORRELATOR RUNNING AT 1.5 THE SAMPLING RATE IN WIRELESS COMMUNICATION SYSTEMS

(75) Inventors: Assaf Kasher, Haifa (IL); Yossi Erlich, Hod HaSharon (IL); Ilan Sutskover, Hadera (IL)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 12/456,931

(22) Filed: Jun. 23, 2009

(65) Prior Publication Data

US 2010/0322321 A1 Dec. 23, 2010

(51) Int. Cl.
*H04L 27/00* (2006.01)
*H04B 1/709* (2011.01)
*H04J 13/00* (2011.01)

(52) U.S. Cl.
CPC ............ *H04J 13/0014* (2013.01); *H04B 1/709* (2013.01); *H04B 2201/70707* (2013.01)
USPC ........................................................ 375/295

(58) Field of Classification Search
USPC ........................................................ 375/295
See application file for complete search history.

(56) References Cited

U.S. PATENT DOCUMENTS

| | | | | |
|---|---|---|---|---|
| 6,567,482 B1 * | 5/2003 | Popovic' | | 375/343 |
| 7,039,036 B1 * | 5/2006 | Dabak et al. | | 370/342 |
| 7,532,663 B2 * | 5/2009 | Lewis | | 375/150 |
| 7,783,110 B2 * | 8/2010 | MacLeod | | 382/190 |
| 7,885,360 B2 * | 2/2011 | Tanabe et al. | | 375/324 |
| 2002/0150182 A1 * | 10/2002 | Dogan et al. | | 375/343 |
| 2002/0183082 A1 * | 12/2002 | Kohlmann | | 455/502 |
| 2003/0231705 A1 * | 12/2003 | Lewis | | 375/150 |
| 2005/0157828 A1 * | 7/2005 | Midya et al. | | 375/372 |
| 2006/0078068 A1 * | 4/2006 | Yan | | 375/316 |
| 2007/0047676 A1 * | 3/2007 | MacLeod | | 375/341 |
| 2008/0298435 A1 * | 12/2008 | Lakkis | | 375/140 |
| 2009/0109955 A1 * | 4/2009 | Lakkis | | 370/350 |
| 2010/0118716 A1 * | 5/2010 | Lakkis et al. | | 370/252 |
| 2010/0118749 A1 * | 5/2010 | Lakkis et al. | | 370/310 |
| 2010/0118802 A1 * | 5/2010 | Lakkis et al. | | 370/329 |
| 2010/0157907 A1 * | 6/2010 | Taghavi Nasrabadi et al. | | 370/328 |

FOREIGN PATENT DOCUMENTS

| | | |
|---|---|---|
| CN | 101155021 A | 4/2008 |
| GB | 2 386 444 A | 9/2003 |
| JP | 2002-539667 A | 11/2002 |
| JP | 2002-543742 A | 12/2002 |
| JP | 2003-32142 A | 1/2003 |
| JP | 2005-519563 A | 6/2005 |

(Continued)

OTHER PUBLICATIONS

International Search Report and Writtent Opinion received for PCT Patent Application No. PCT/US2010/031987, mailed on Dec. 3, 2010, 10 pages.

(Continued)

*Primary Examiner* — Santiago Garcia
(74) *Attorney, Agent, or Firm* — Ellis B. Ramirez; Prass LLP

(57) ABSTRACT

An embodiment of the present invention provides an apparatus, comprising a transmitter operable to communicate in a wireless network and adapted to use an efficient Golay correlator running at 1.5 times a sampling rate.

4 Claims, 1 Drawing Sheet

(56) References Cited

FOREIGN PATENT DOCUMENTS

| JP | 2010-506503 | A  | 2/2010  |
|----|-------------|----|---------|
| WO | 00/54424    | A2 | 9/2000  |
| WO | 00/67405    | A1 | 11/2000 |
| WO | 2008/042874 | A2 | 4/2008  |
| WO | 2011/005347 | A1 | 1/2011  |

OTHER PUBLICATIONS

Office Action Received for Chinese Patent Application No. 201010219464.3, mailed on Sep. 29, 2012, 6 pages of Office Action and 8 pages of English Translation.

International Preliminary Report on Patentability Received for PCT Patent Application No. PCT/US2010/031987, mailed on Jan. 12, 2012, 6 pages.

Office Action received for Korean Patent Application No. 10-2011-7029376, Mailed on Mar. 27, 2014, 14 pages of Office Action including 7 pages of English Translation.

Office Action Received for Japanese Patent Application No. 2012-516085, Mailed on Mar. 18, 2014, 6 pages of office action including 3 pages of English Translation.

Office Action Received for Chinese Patent Application No. 201010219464.3, mailed on Jun. 20, 2013, 3 Pages of Office action and 4 pages of English Translation.

Office Action Received for Japanese Patent Application No. 2012-516085, mailed on May 28, 2013, 5 pages of Office Action and 4 pages of English Translation.

Office Action Received for Korean Patent Application No. 10-2011-7029376, mailed on Jan. 11, 2013, 4 pages of Office Action and 3 Pages of English Translation.

Perez et al., "Efficient Real-Time Correlator for LS Sequences", ISIE 2007, Jun. 4-7, 2007, pp. 1663-1668.

Office Action received for Korean Patent Application No. 10-2011-7029376, mailed on Aug. 20, 2013, 6 pages of Office Action and 6 Pages of English Translation.

Office Action received for Japanese Patent Application No. 2012-516085, mailed on Oct. 15, 2013, 4 pages of Office Action and 4 Pages of English Translation.

\* cited by examiner

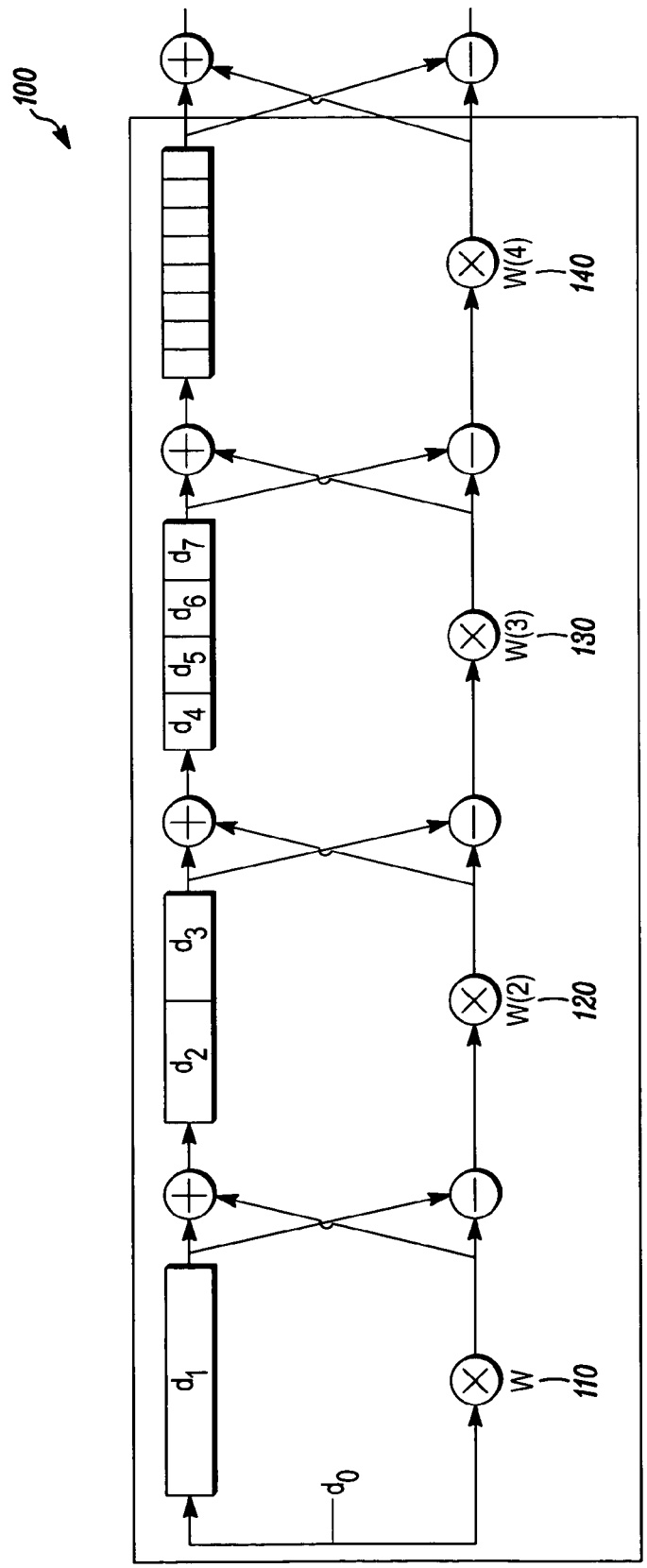

APPARATUS AND METHODS USING AN EFFICIENT GOLAY CORRELATOR RUNNING AT 1.5 THE SAMPLING RATE IN WIRELESS COMMUNICATION SYSTEMS

BACKGROUND

Golay (complementary) sequences are starting to play an important role in wireless communications. These sequences have the property that if Ga(n) and Gb(n) are a complementary pair, the sum of correlation of Ga with itself and Gb with itself is equal to the delta function. This property makes these sequences very useful for channel estimation. Some of these sequences also have the property that there is a large zero auto correlation zone around the peak of the correlation when correlating the sequence Ga with itself (or Gb with itself). However, improvements to the implementation of complementary sequences are needed to further improve wireless communications.

Thus, a strong need exists for improved apparatus and methods which may provide for significant improvements in the implementation of Golay sequences in wireless communication systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 depicts a correlator performing M=2m additions per input samples so as to perform only m additions per input sample according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

As mentioned above, Golay (complementary) sequences are starting to play an important part in wireless communications. These sequences have the property that if Ga(n) and Gb(n) are a complementary pair, the sum of correlation of Ga with itself and Gb with itself is equal to the delta function. This property makes these sequences very useful for channel estimation. Some of these sequences also have the property that there is a large zero auto correlation zone around the peak of the correlation when correlating the sequence Ga with itself (or Gb with itself).

Another very important property of Golay sequences is that there is an efficient implementation of a correlator with a Golay sequence. In this implementation, rather than performing $M=2^m$ additions per input samples it is possible to perform only m additions per input sample. This implementation is shown in FIG. 1, shown generally as 100, with multipliers W 110, W(2) 120, W(3) 130 and W(4) 140.

Embodiments of the present invention provide a transmitter operable to communicate in a wireless network and adapted to use an efficient Golay correlator running at 1.5 times a sampling rate. Further, embodiments of the present invention provide the signal is passing through delays (D(n)) and multiplied by weights W(n) and then additions are performed. D(n) may be a permutation of (1,2,4, 2m) and in most cases without any permutation. In embodiments of the present invention, W(n) may be any modulus one complex multiplier but in most cases it would be ±1 or ±j—although the present invention is not limited in this respect. It is noted that if w(1) is j and w(2) is −1 this correlator will give the correlation with a sequence whose correlator has w(1)=1 and w(2)=1 and was modulated by a exp(−jπn/2), which is important for GMSK and BPSK transmitters. The output of the upper branch is a correlation with Ga and that of the lower branch is a correlation with Gb.

An embodiment of the present invention provides an implementation for this correlator for a situation where the transmitter generates the signal at chip frequency Fc and the receiver samples the signal at Fs=1½ Fc. This happens when the transmitter is transmitting possibly a single carrier packet and the receiver is expecting either an SC or an OFDM packet. It may also be useful when the receiver samples at this rate to facilitate digital filtering instead of analog. In an embodiment of the present invention, an implementation all the delays D(n) are replaced with 1.5 D(n) (i.e a delay by 2 is replaced by a delay by 3, etc.) except to the first delay which remains 1. Everything else remains the same, except to the multiplier W(1) 120 which is converted to exp(j2π/3) if w(1) had equaled to j. This implementation gives an impulse response very close to correlating with the original sequences. It is close enough to be useful in any implementation of the sequence. If not for embodiments set forth herein in the present invention, the sequence would have had to be resampled to the chip sampling rate, where some information may have been lost; or the correlation may have had to be done with a resampled sequence, which means 1.5×2m multipliers per sample rather than the 1 multiplier plus m adders provided in embodiments of the present invention. Further, embodiments of the present invention can be extended to other rational sampling rate convertios (2, 5/4 etc.).

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a transmitter operable to communicate in a wireless network and adapted to use an efficient Golay correlator, wherein the Golay correlator comprises:
a sequence of delays D (n) configured to generate at least one sequence of delays, wherein a delay D(n) is selected from a group consisting of any permutation of delay elements;
a sequence of multipliers interconnected with an input and the sequence of delays D(n) to apply weight factors;
wherein all delays D(n) transmitted by said transmitter are replaced with 1.5D(n) except a first delay which remains 1;
wherein said transmitter generates a signal at chip frequency Fc and a receiver in communication with said transmitter samples said signal at 1.5Fc;
wherein a first multiplier associated with transmissions from said transmitter is converted to $\exp(j2\pi/3)$ thereby producing an impulse response very close to correlating with original sequences.

2. A method, comprising:
using an efficient Golay correlator running at 1.5 times a sampling rate in a transmitter operating to communicate in a wireless network by:
generating at least one sequence of delays with a sequence of delays D(n), wherein a delay D(n) is selected from a group consisting of any permutation of delay elements;
applying weight factors with a sequence of multipliers to an input and to the sequence of delays D(n); and
replacing all delays D(n) transmitted by said transmitter with 1.5D(n), except a first delay which remains 1;
generating by said transmitter a signal at chip frequency Fc and a receiver in communication with said transmitter samples said signal at 1.5Fc;
wherein a first multiplier associated with transmissions from said transmitter is converted to $\exp(j2\pi/3)$ thereby producing an impulse response very close to correlating with original sequences.

3. A non-transitory computer readable medium encoded with computer executable instructions, which when accessed, cause a machine to perform operations comprising:
using an efficient Golay correlator running at 1.5 times a sampling rate in a transmitter operating to communicate in a wireless network by:
generating at least one sequence of delays with a sequence of delays D(n), wherein a delay D(n) is selected from a group consisting of any permutation of delay elements;
applying weight factors with a sequence of multipliers W(n) to an input and to the sequence of delays D(n); and
replacing all delays D(n) transmitted by said transmitter with 1.5D(n), except a first delay which remains 1;
generating by said transmitter a signal at chip frequency Fc and a receiver in communication with said transmitter samples said signal at 1.5Fc;
wherein a first multiplier associated with transmissions from said transmitter is converted to $\exp(j2\pi/3)$ thereby producing an impulse response very close to correlating with original sequences.

4. A system, comprising:
a first transceiver operable as a base station (BS) in a wireless network; and
a second transceiver operable as a mobile station (MS) is said wireless network and operable to communicate with said BS;
an efficient Golay correlator running at 1.5 times a sampling rate in a transmitter operating at said BS or said MS, wherein the Golay correlator comprises:
a sequence of delays D(n) configured to generate at least one sequence of delays, wherein a delay D(n) is selected from a group consisting of any permutation of delay elements;
a sequence of multipliers interconnected with an input and the sequence of delays D(n) to apply weight factors;
wherein all delays D(n) transmitted by said transmitter are replaced with 1.5D(n) except a first delay which remains 1;
wherein said transmitter generates a signal at chip frequency Fc and a receiver in communication with said transmitter samples said signal at 1.5Fc;
wherein a first multiplier associated with transmissions from said transmitter is converted to $\exp(j2\pi/3)$ thereby producing an impulse response very close to correlating with original sequences.

* * * * *